March 28, 1944.   J. K. SIMPSON   2,345,433
FLUID DRIVING MECHANISM
Filed March 7, 1942   3 Sheets-Sheet 1

Inventor
John Keith Simpson
By David F. Doody
Attorney

March 28, 1944.  J. K. SIMPSON  2,345,433
FLUID DRIVING MECHANISM
Filed March 7, 1942  3 Sheets-Sheet 2
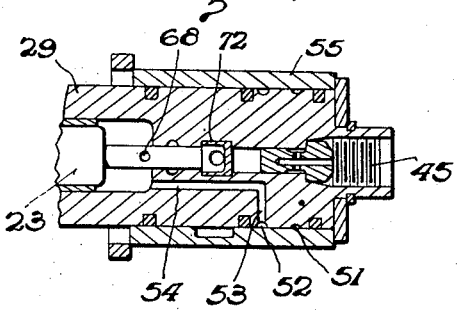
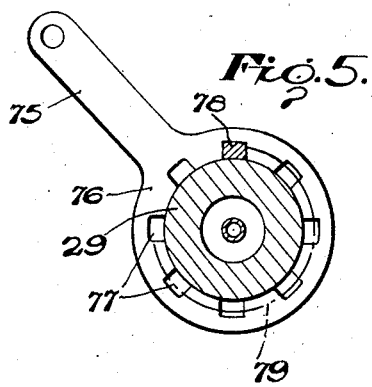
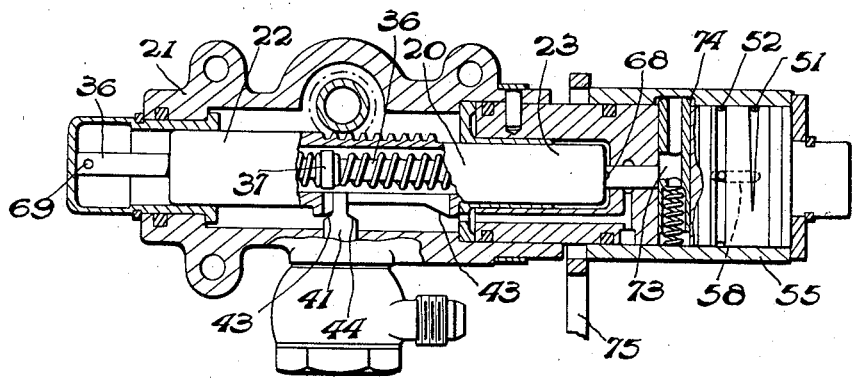
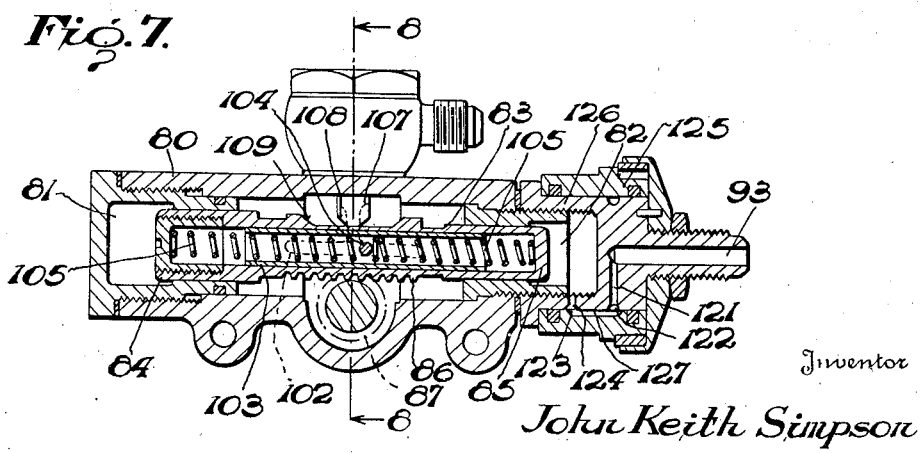
Inventor
John Keith Simpson
By David F. Doody
Attorney March 28, 1944.　　　J. K. SIMPSON　　　2,345,433
FLUID DRIVING MECHANISM
Filed March 7, 1942　　　3 Sheets-Sheet 3

Inventor
John Keith Simpson
By David F. Doody
Attorney

Patented Mar. 28, 1944

2,345,433

UNITED STATES PATENT OFFICE 2,345,433

FLUID DRIVING MECHANISM

John Keith Simpson, Leamington Spa, England, assignor to Automotive Products Company Limited, Leamington Spa, England Application March 7, 1942, Serial No. 433,812
In Great Britain March 11, 1941

11 Claims. (Cl. 121—123)

This invention relates to fluid pressure driving mechanism for reciprocating or oscillating devices such as wipers for the windscreens of motor vehicles and aircraft and has for its object to provide a compact and efficient driving mechanism.

According to the invention, a fluid pressure driving mechanism for reciprocating or oscillating devices comprises a piston element having a greater area at one end than at the other and movable alternately in opposite directions by fluid pressure acting in the one case on its smaller end only and in the other case on both its ends simultaneously, a valve to connect the larger end of the piston alternatively to pressure or exhaust, spring means for loading the valve as the piston element approaches each end of its stroke, and a latch to hold the valve against said spring means until the piston element reaches the end of its stroke, when said latch is tripped to permit the valve to change over.

The larger end of the piston element preferably has twice the area of the smaller end and a valve operating member may be slidably mounted within the piston element, the spring means for loading the valve being mounted to act between said member and the ends of the piston assembly. The latch may be operated by a cam surface moving with the piston element. A stop device may be provided which is adapted to be projected into the path of the valve member to prevent its movement and so to stop the mechanism and a variable restriction may be provided in the path of the fluid entering the mechanism, the variation of the restriction providing a speed control for the mechanism. The stop device and the speed control may be operated by a common handle or equivalent.

In one form of the invention, the driving mechanism may comprise a housing, a piston element reciprocable in said housing and having a greater area at one end than at the other, each end of the piston element co-operating with a cylinder of corresponding size, a rack formed intermediate the ends of the piston element and driving a pinion on the oscillating shaft, a hollow rod extending through said piston element and movable between two extreme positions, in one of which the passage through it connects the two cylinders together and in the other of which the said passage connects the larger cylinder to an exhaust outlet, an enlargement intermediate the ends of the hollow rod, springs mounted between said enlargement and the ends of the piston, a latch adapted to engage said enlargement and prevent movement of the hollow rod, and cam faces on the piston to release the latch when the piston approaches either end of its stroke, whereby fluid under pressure supplied to the smaller cylinder is caused to act alternately on the smaller end only and on both ends together of the piston element and to produce reciprocation of the said piston element, the hollow rod being moved from one extreme position to the other each time the latch is released by the energy stored in one of the springs during the immediately preceding movement of the piston element.

In another form of the invention, the driving mechanism may comprise a housing, a piston element reciprocable in said housing and having a greater area at one end than at the other, each end of the piston element co-operating with a cylinder of corresponding size, a rack formed intermediate the ends of the piston element and driving a pinion on the oscillating shaft, a passage connecting the two cylinders, an angularly movable valve member in said passage adapted to connect the larger cylinder to the smaller cylinder or to an exhaust passage, an arm on said valve member, a pin engaging said arm and mounted in a carrier slidable in the piston element, springs acting between the sides of the carrier and the ends of the piston element, and a latch adapted to prevent movement of said arm, the latch being moved out of the path of the arm by cam faces on the piston element when the latter approaches either end of its stroke to permit the valve to be changed over by the energy stored in one of the springs during the immediately preceding piston stroke, whereby fluid under pressure supplied to the smaller cylinder is caused to act alternately on the smaller end only, and on both ends together, of the piston element and to produce reciprocation of the piston element.

The invention is hereinafter described with reference to the accompanying drawings, in which—

Figure 4 is a partial sectional plan on the line 4—4 of Figure 1;

Figure 5 is a transverse section on the line 5—5 of Figure 1;

Figure 6 is a longitudinal section similar to Figure 1 but with certain parts in elevation and showing the mechanism locked to prevent the movement of the piston element;

Figure 7 is a longitudinal section through another form of fluid pressure driving mechanism according to the invention;

Figure 1:
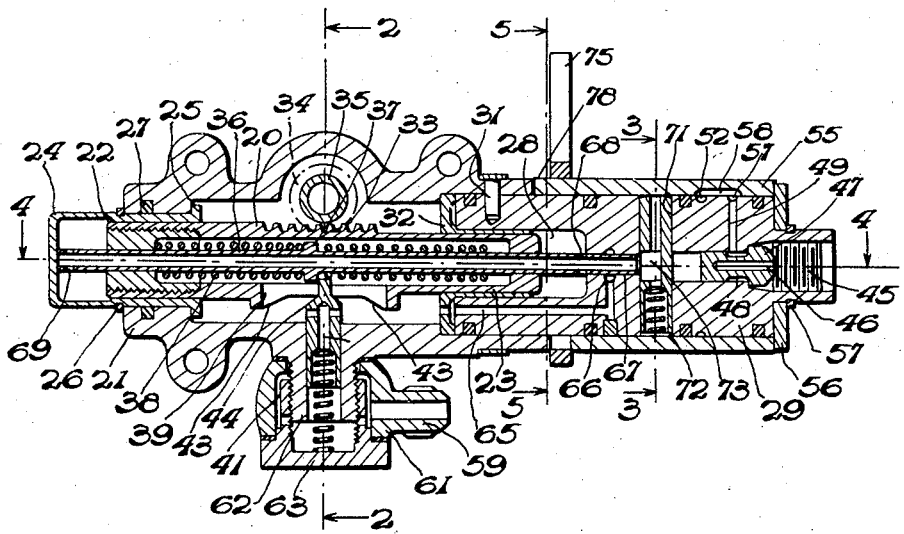
Figure 1 is a longitudinal section through a fluid pressure driving mechanism according to the invention.
Figure 2:
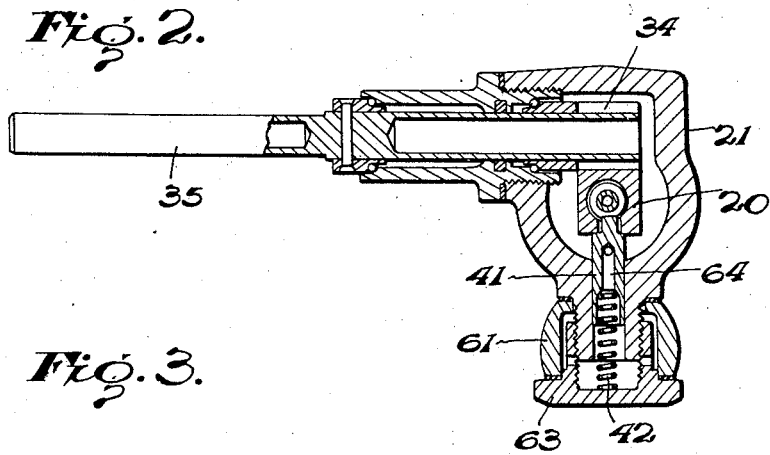
Figure 2 is a transverse section on the line 2—2 of Figure 1.
Figure 3:
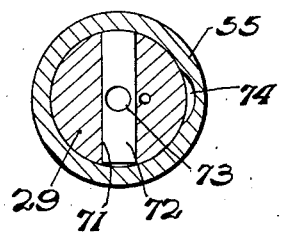
Figure 3 is a transverse section on the line 3—3 of Figure 1.
Figure 8:
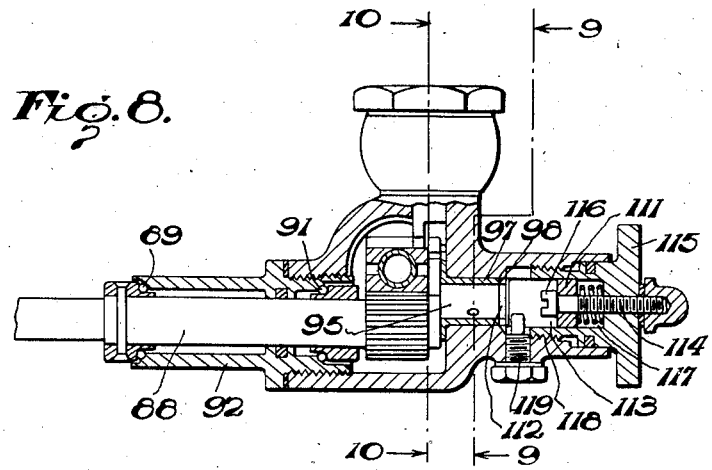
Figure 8 is a transverse section on the line 8—8 of Figure 7.

In the form of driving mechanism illustrated in Figures 1 to 6 which is designed to operate the oscillating arm of a windscreen wiper, a double-ended piston element 20 is reciprocable in a housing 21. One end 22 of the piston element has an area twice that of the other end 23, the larger end 22 fitting slidably in a cylinder 24 formed by a cup-like member projecting from the end of the housing, the cylinder 24 being formed at its inner end with a flange to engage a shoulder 25 in the housing and being held in place by a spring ring 26. A fluid seal 27 is provided between the housing and the cylinder. The smaller end 23 of the piston enters a second cylinder 28 formed in a cylindrical block 29 fitting into the other end of the housing 21 into which it is secured by dowels 31, a flanged cylinder liner 32 being clamped between the block 29 and a shoulder in the housing. The intermediate portion of the piston element 20 is formed on one side with rack teeth 33 meshing with a pinion 34 on a spindle 35 to which the wiper arm (not shown) is attached. A tubular rod 36 extends longitudinally through the piston element and into a bore in the block 29 in which it is a close sliding fit and is normally free to move longitudinally to a limited extent in the housing, the rod forming a valve member for connecting the cylinder 24 alternately to inlet and exhaust as will be hereinafter described. Intermediate the ends of the rod is formed a collar 37 and a spring 38 extends between this collar and each end of the hollow space within the piston element, the springs tending to position the collar substantially at the centre of the piston element. On the side of the piston element opposite to the rack teeth 33 is formed a slot 39 through which projects a plunger 41 slidable in a transverse aperture in the wall of the housing 21 and urged towards the piston element by a spring 42. The end of the plunger 41 projects into the path of the collar 37 and normally prevents movement thereof. Towards each end of the slot 39, however, there are formed ramps 43 on each side of the slot and the plunger 41 is enlarged to form inclined shoulders 44 wide enough to engage with these ramps, so that as the piston approaches either end of its stroke the plunger is pushed outwardly away from the path of the collar 37. A fluid pressure inlet is provided at 45, from which a stopped longitudinal passage 46 in a plug 47 leads through radial passages 47 and a groove 48 on the exterior of the plug to a radial passage 49 in the block 29, itself leading to an eccentric groove 51 on the exterior of the block. Spaced longitudinally from the eccentric groove 51 is a concentric groove 52 extending right round the block 29 and from this groove 52 a radial passage 53 leads into a longitudinal passage 54 which leads into the cylinder 28. The passages 53 and 54 are shown in Figure 4. A sleeve 55 surrounding the block 29 and located thereon by a disc 56 held in place by a spring ring 57 is formed with a longitudinal groove 58 bridging the grooves 51 and 52 in the block 29. The exhaust outlet from the mechanism is at 59 and is formed by a banjo connection 61 surrounding a spigot 62 through which extends the aperture in which the plunger 41 slides, the spring 42 taking its abutment on the head of the banjo bolt 63. The outlet is connected through passages 64 in the plunger 41 to the central space in the housing 21 and from that space through a passage 65 in the block 29 to an annular groove 66 surrounding the bore 67 in the block 29 into which the end of the hollow rod 36 extends.

As above stated, the hollow rod 36 forms a valve to connect the larger cylinder 24 alternately to the pressure inlet 45 and the exhaust 59 and with this object in view the rod is provided with a series of radial ports 68 near its end which enters the block 29 and a second series of radial ports 69 close to its other end. The travel of the rod is such that when in its extreme position towards the left, as shown in Figure 1, the ports 68 are open to the smaller cylinder 28, whilst when the rod is in its other extreme position the ports 68 register with the annular groove 66.

At the right hand end of the hollow rod 36 is a square transverse bore 71 in the block 29, in which is mounted a square plunger 72 spring loaded at one end. In the centre of the plunger is a recess 73 into which the end of the rod 36 moves when the rod moves towards the right, so long as the recess lies opposite to the end of the rod. The sleeve 55 extends over the part of the block containing the plunger 72 and is formed, in the cross-sectional plane intersecting the plunger, with an internal groove 74 (see Figure 3). The sleeve 55 is angularly movable on the block 29 and when the groove 74 is brought opposite the end of the plunger 72 opposite to the spring loaded end the plunger drops into the groove and the recess 73 moves out of register with the bore 67, thus preventing movement of the valve rod 36. The angular movement of the sleeve 55 also moves the groove 58 relatively to the grooves 51 and 52 and as the groove 51, being eccentric, tapers in cross section a variable restriction of the fluid pressure supply is provided, by means of which the speed of operation of the mechanism can be controlled. The relative positioning of the groove 58 and the groove 74 in the sleeve 55 is such that the plunger 72 stops the movement of the rod 36 when the speed of movement of the mechanism has been reduced to the minimum. A lever 75 is provided to turn the sleeve 55, the lever being formed integral with a ring 76 formed internally with a number of slots 77, through one of which passes a finger 78 projecting longitudinally from the sleeve 55. The angular movement of the sleeve is limited by the finger 78 contacting with an extended portion 79 of the housing 21, the extent of this portion 79 being shown in chain-dotted lines in Figure 5.

Assuming the sleeve 55 to be set in such a position that the mechanism is free to operate, and that the inlet 45 is connected to a source of fluid under pressure, the piston element 20 will be driven alternately in opposite directions. In the position shown in Figure 1, the cylinder 24 is connected to the cylinder 28 by the passage through the tubular rod 36, so that pressure is acting on both ends of the piston element, and, due to the greater area of the end 23, it will move towards the right. The plunger 41 engages the right-hand side of the collar 37 on the rod 36 and consequently the spring 38 between the collar and the larger end of the piston is compressed. As the piston element approaches the right-hand end of its stroke the left-hand end of the slot 39 approaches the plunger 41 and the ramp 43 at that end of the slot comes into engagement with the shoulder 44 on the plunger. Further movement of the piston element causes the shoulder 44 to ride down the ramp 43, withdrawing the plunger from the path of the collar 37. As soon as the plunger is clear of the collar the rod 36 is urged to the right by the compressed spring 38, with the result that the apertures 68 in the rod are brought into register with the annular groove 66 and the cylinder 24 is connected to the exhaust, whilst the cylinder 28 remains connected to the pressure supply. The movement of the valve rod is considerably less than the movement of the piston element, so that the spring 38 which was compressed to move the valve rod remains compressed even after movement of the rod has taken place, holding the latter in its new position until, due to the return movement of the piston, the plunger 41 moves back into the path of the collar, but on its left-hand side, where it remains until it is again moved outwardly by the ramp 43 at the right-hand end of the slot 39. The movement of the rod 36 is such that the collar 37 just moves from one side of the plunger 41 to the other. The piston element thus continues to reciprocate so long as fluid pressure is supplied to the inlet 45 and the spindle 35 is caused to oscillate by the pinion 34 meshing with the rack 33.

To stop the mechanism, the movement of the rod 36 towards the right is prevented, thus preventing the cylinder 24 from being connected to exhaust. When the mechanism is to be stopped, the sleeve 55 is turned to the position shown in Figure 6, where the groove 74 is opposite the end of the plunger 72. If the rod 36 is in its left-hand position, or as soon as it moves to that position, the plunger 72 is forced by its spring into the groove 74, thus moving the recess 73 out of register with the end of the rod. When, therefore, the piston element returns to the right-hand end of its stroke and the plunger 41 is forced back to release the rod 36 the latter is unable to move. Consequently the fluid in the cylinder 24 is unable to escape and the mechanism stops. The mechanism is shown in this position in Figure 6. The groove 58 in the sleeve 55, which connects the grooves 51 and 52 in the block 29, is so disposed in relation to the groove 74 that as the latter approaches its position opposite the end of the plunger 72 the groove 58 moves towards the part of the eccentric groove of smaller cross-section, thus placing an increasing restriction in the path of the fluid and so reducing the speed of the mechanism. The operation of the mechanism is, therefore, fully controlled by the lever 75, which in one extreme position sets the mechanism for operation at maximum speed and in the other extreme position stops it, the speed of operation decreasing as the lever is moved from the former to the latter position.

An alternative form of driving mechanism according to the invention, again designed for the operation of wind-screen wipers, is shown in Figures 7 to 10.

The driving mechanism has a body 80 comprising a central chamber from the ends of which extend two working cylinders 81 and 82, the cylinder 81 having twice the cross-sectional area of the other cylinder 82. A double ended piston element 83 having its two ends 84 and 85 of a size to fit in the respective cylinders 81 and 82 is mounted in the body, the central part of the piston element being formed on one side with rack teeth 86 to engage a pinion 87 mounted on a shaft 88 itself mounted, with its axis perpendicular to that of the piston element, in spaced bearings 89 and 91 in a sleeve 92 screwed into the body 80. The piston element 83 is hollow and is closed at both ends. The cylinder 82 is connected constantly to a source of supply of fluid under pressure entering the unit at 93 and a connecting passage 94 (Figure 9) leads from that cylinder to the larger cylinder 81, a valve being arranged in the passage 94. The valve comprises a cylindrical plug 95 capable of angular movement about its axis under the control of an arm 96 (Figure 10) actuated by the piston element 83 and is arranged in a bore 97 in the body 80 projecting from the central chamber in a direction perpendicular to the axis of the piston element, a steel sleeve 98 being provided in the bore 97 to receive the plug 95. The valve plug 95 has a diametral bore 99 adapted, in one position of the valve, to connect the two parts of the passage 94 on opposite sides of the valve and a channel 101 parallel to its axis which, in the other position of the valve, connects the part of the passage 94 leading to the cylinder 81 to the central chamber of the body 80 which is connected to an exhaust outlet. The valve plug 95 is operated by the piston element in the following manner. The central part of the piston element is slotted longitudinally at 102 and slidable within the slotted part is a tube 103 drilled diametrally to receive a pin 104 projecting through the slots 102. A pair of springs 105, 105 within the piston element act each on one side of the pin 104 and take their abutment on the respective ends of the piston element. One end of the pin 104 engages with a slot 106 in the arm 96 of the valve plug so as to move the valve angularly as the tube 103 moves in the direction of the axis of the piston assembly. A latch 107 co-operates with the arm 96 to prevent its movement, the latch 107 being moved out of the path of the arm when the piston element reaches the end of its stroke. The latch 107 comprises a spring loaded plunger movable in a direction perpendicular to the axis of the piston assembly and is provided at its nose with opposite inclined surfaces 108, 108 to co-operate with a pair of ramps 109, 109 or the piston element, one of which lifts the latch at each end of the piston travel to release the valve in the same manner as the ramps 43 operate the latch plunger 41 in the construction previously described. The inclined surfaces 108 extend across only a part of the width of the latch 107, the other part of its nose end having parallel sides to engage the arm 96.

Figure 9:
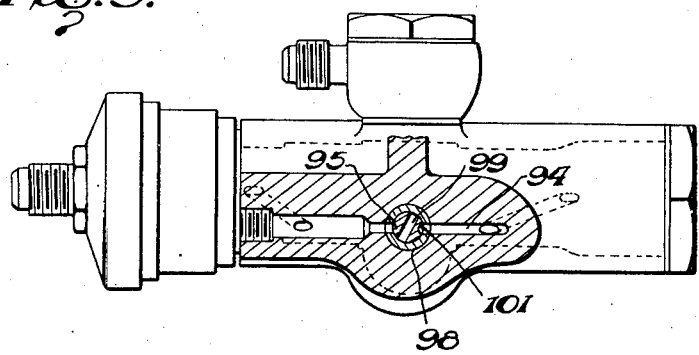
Figure 9 is a longitudinal section on the line 9—9 of Figure 8.
Figure 10:
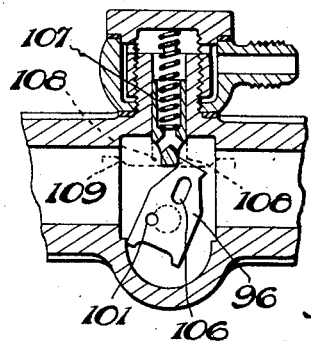
Figure 10 is a fragmentary sectional view on the line 10—10 of Figure 8.

Assuming that the piston element 83 is moving towards the left as seen in Figure 7, to produce which movement the fluid pressure is acting on the smaller end 85, the valve is now positioned as in Figures 9 and 10 and connects the cylinder 81 to the exhaust, the latch 107 holding it in place. As the piston element moves, one of the springs 105 is compressed, the end of the latch bearing on a surface of the piston assembly between the two ramps 109, 109. Fluid is free to escape from the cylinder 81. When the piston element approaches the end of its stroke, one of the inclined surfaces 108 on the latch engages with the appropriate ramp 109 on the piston element and is pushed back until the latch moves out of engagement with the arm 96 of the valve plug and the energy stored in the spring 105, acting on the pin 104, turns the valve through an angle to bring the diametral bore 99 into line with the connecting passage 94 between the cylinders 81 and 82, thus connecting the larger cylinder 81 to the fluid pressure supply and cutting it off from the exhaust. As the pressure is now acting on both ends of the piston element, there is a predominance of thrust on the larger end and the piston element is urged in the opposite direction to that in which it had previously been travelling. During the first part of the movement, the latch 107 slides off the ramp 109 and re-engages with the arm 96 of the valve plug, on the opposite side to that with which it previously engaged, thus holding the valve 95 in its new position. Until the latch re-engages, the spring 105 which has just changed the position of the valve retains sufficient load to hold the valve in position. The new setting of the valve is maintained until the piston assembly has completed its return stroke, when the valve is again changed over, the piston assembly unit thus continuing to reciprocate.

Provision is made for stopping the reciprocation of the piston element and for controlling the speed of its movement. The mechanism for stopping the reciprocation of the piston comprises a diametrically grooved plunger 111 (Figure 8) which engages with a diametral rib 112 across the end of the valve plug 95 and prevents its from turning. The plunger 111 is mounted in an extension of the bore 97 which receives the valve plug and has a deep diametral slot 113 extending from its end adjacent the valve plug. The plunger 111 is slidable on a pin 114 mounted in a cap 115 rotatable in the bore of the housing, the inward movement of the plunger 111 being limited by a head 116 on the pin, towards which head the plunger is urged by a light spring 117. The cap 115 engages with a thread 118 in the bore so that on being turned it moves into or out of the bore and the plunger 111 is restrained against rotation, but not against longitudinal movement, by a pin 119 projecting into the diametrical slot 113. The axial travel of the rotatable cap 115 is such that, when it is withdrawn as far as possible, the end of the plunger 111 is axially spaced from the rib 112, whilst when the cap is rotated to its innermost position the plunger is urged by the spring towards a position in which the rib engages in the slot, thus preventing the valve plug from turning. The spring 117 enables the plunger to be pushed back when the head is moved to its inward position, so that, if the slot does not at once register with the rib, the plunger bears on the end of the latter until the rib moves into the appropriate position, when the plunger is urged forward by the spring and the rib enters the slot.

The speed of operation of the wiper is controlled by a variable restriction in the fluid pressure supply passage, the arrangement being substantially identical with that described in connection with the form of the invention shown in Figures 1 to 6. The fluid is fed from the inlet 93 to an axial passage from which it passes by way of a radial passage 121 to a circumferential groove 122 of constant cross-section on the exterior of the end cap in which the inlet 93 is formed. Parallel to this circumferential groove 122 is a second groove 123 of tapering cross-section connected by a radial passage 124 to the cylinder 82 at the smaller end of the piston, the radial passage leading from the part of the groove 123 having the largest cross-section. The two grooves are covered by a sleeve 125 rotatable on the outer surface of the end cap 126, the sleeve having in its internal surface a longitudinal groove 127 which bridges the two grooves in the end cap. It is evident that by turning the sleeve 125 relatively to the end cap 126, to bring the longitudinal grooves 127 into register with different portions of the tapering groove 123, the degree of restriction of the flow of fluid into the driving unit is varied and so the speed of operation is varied.

The mechanism may be operated by liquid or gas under pressure and may be used for driving mechanism other than windscreen wipers. It may be used to drive oscillating members by means of rack and pinion mechanism, as described herein, or to drive reciprocating devices which may be directly coupled to the piston unit, or connected thereto by suitable linkage.

What I claim is:

1. A fluid pressure driving mechanism for reciprocating or oscillating devices comprising a piston element having a greater area at one end than at the other and movable alternatively in opposite directions by fluid pressure acting in the one case on its smaller end only and in the other case on both its ends simultaneously, a valve to connect the larger end of the piston alternatively to pressure or exhaust, a valve operating member slidably mounted in said piston element, spring means mounted between said valve operating member and the ends of said piston element for loading the valve as the piston element approaches each end of its stroke, and a latch to hold the valve against said spring means until the piston element reaches the end of its stroke, when said latch is tripped to permit the valve to change over.

2. A fluid pressure driving mechanism for an oscillating device, comprising a housing an oscillating shaft extending into said housing, said shaft carrying a pinion, a piston element reciprocable in said housing and having a greater area at one end than at the other, each end of the piston element co-operating with a cylinder of corresponding size, a rack formed intermediate the ends of the piston element and driving said pinion on said oscillating shaft, a hollow rod extending through said piston element and movable between two extreme positions in one of which the passage through it connects the two cylinders together and in the other of which the said passage connects the larger cylinder to an exhaust outlet, an enlargement intermediate the ends of the hollow rod; springs mounted between said enlargement and the ends of the piston element, a latch adapted to engage said enlargement and prevent movement of the hollow rod, and cam faces on the piston element to release the latch when the piston element approaches either end of its stroke, whereby fluid under pressure supplied to the smaller cylinder is caused to act alternately on the smaller end only, and on both ends together of the piston element, and to produce reciprocation of the said piston element, the hollow rod being moved from one extreme position to the other each time the latch is released by the energy stored in one of the springs during the immediately preceding movement of the piston element.

3. A fluid pressure driving mechanism according to claim 2, wherein the smaller cylinder is formed in a cylindrical block projecting from the housing, and the hollow rod enters a bore concentric with the cylinder, a series of ports in said rod registering respectively in the two extreme positions of the rod, with the interior of the cylinder and with an annular groove surrounding said bore and connected to an exhaust passage.

4. A fluid pressure driving mechanism according to claim 2, wherein the hollow rod in one position enters a recess in a plunger mounted in a transverse bore in the housing, the plunger being movable in the transverse bore to move the recess out of register with the rod and prevent the said rod from reaching that position.

5. A fluid pressure driving mechanism according to claim 2, wherein the smaller cylinder is formed in a cylindrical block projecting from the housing, and the hollow rod enters a bore concentric with the cylinder, a series of ports in said rod registering respectively in the two extreme positions of the rod, with the interior of the cylinder and with an annular groove surrounding said bore and connected to an exhaust passage, and wherein the cylindrical block is surrounded by an angularly movable sleeve having an internal cam groove in the cross-sectional plane of the plunger, the plunger being spring loaded to enter the said groove when the sleeve is turned to the appropriate position and thus to bring the recess out of register with the hollow rod.

6. A fluid pressure driving mechanism for an oscillating device comprising a housing, a piston element reciprocable in said housing and having a greater area at one end than at the other, each end of the piston element cooperating with a cylinder of corresponding size, a rack formed intermediate the ends of the piston element and driving a pinion on the oscillating shaft, said piston element carrying cam faces therein, a passage connecting the two cylinders, an angularly movable valve member in said passage adapted to connect the larger cylinder to the smaller cylinder or to an exhaust passage, an arm on said valve member, a pin engaging said arm and mounted in a carrier slidable in the piston element, springs acting between the sides of the pin and the ends of the piston element, and a latch adapted to prevent movement of said arm, the latch being moved out of the path of the arm by said cam faces on the piston element when the latter approaches either end of its stroke to permit the valve to be changed over by the energy stored in one of the springs during the immediately preceding piston stroke, whereby fluid under pressure supplied to the smaller cylinder is caused to act alternately on the smaller end only, and on both ends together, of the piston element and to produce reciprocation of the piston element.

7. A fluid pressure driving mechanism according to claim 6, wherein the valve member is formed with a diametral rib across one end, and a plunger having a diametral slot across its adjacent end is movable towards and away from the said valve member, the rib entering the slot when the plunger is moved towards the valve member to prevent movement of the valve member.

8. A fluid pressure driving mechanism for reciprocating or oscillating devices comprising a piston element having a greater area at one end than at the other and movable alternately in opposite directions by fluid pressure acting in the one case on its smaller end only and in the other case on both its ends simultaneously, a valve to connect the larger end of the piston alternatively to pressure or exhaust, a valve operating member slidably mounted within said piston element, spring means for loading the valve as the piston element approaches each end of its stroke, said spring means being mounted to act between said valve operating member and the ends of said piston element, and a latch to hold the valve against said spring means until the piston element reaches the end of its stroke, when said latch is tripped to permit the valve to change over.

9. A fluid pressure driving mechanism for reciprocating or oscillating devices comprising a piston element having a greater area at one end than at the other and movable alternately in opposite directions by fluid pressure acting in the one case on its smaller end only and in the other case on both its ends simultaneously, a cam surface carried by said piston element, a valve to connect the larger end of the piston alternatively to pressure or exhaust, a valve operating member slidably mounted within said piston element, spring means for loading the valve as the piston element approaches each end of its stroke, said spring means being mounted to act between said valve operating member and the ends of said piston element, and a latch to hold the valve against said spring means until the piston element reaches the end of its stroke, when said latch is tripped by said cam surface to permit the valve to change over.

10. A fluid pressure driving mechanism for reciprocating or oscillating devices comprising a piston element having a greater area at one end than at the other and movable alternately in opposite directions by fluid pressure acting in the one case on its smaller end only and in the other case on both its ends simultaneously, means including a valve to connect the larger end of the piston alternatively to pressure or exhaust, a valve operating member slidably mounted in the piston element, spring means mounted between the valve operating member and the ends of the piston element for loading the valve as the piston element approaches each end of its stroke, a latch to hold the valve against said spring means until the piston element reaches the end of its stroke, and trip means moving with said piston element to trip the latch when the said piston element reaches the end of its stroke, thus permitting the valve to change over.

11. A fluid pressure driving mechanism for reciprocating or oscillating devices comprising a piston element having a greater area at one end than at the other and movable alternately in opposite directions by fluid pressure acting in the one case on its smaller end only and in the other case on both its ends simultaneously, means including a valve to connect the larger end of the piston alternatively to pressure or exhaust, a valve operating member slidably mounted in the piston element, spring means mounted between the valve operating member and the ends of the piston element for loading the valve as the piston element approaches each end of its stroke, and means operable when said piston element reaches the end of its stroke to cause said valve to change over.

JOHN KEITH SIMPSON.